Oct. 4, 1960 P. MALLERY 2,955,212

MAGNETIC CONTROL CIRCUITS

Filed Dec. 15, 1958 2 Sheets-Sheet 1

INVENTOR
P. MALLERY
BY
William H. Kamstra
ATTORNEY

Oct. 4, 1960 P. MALLERY 2,955,212

MAGNETIC CONTROL CIRCUITS

Filed Dec. 15, 1958 2 Sheets-Sheet 2

INVENTOR
P. MALLERY
BY William H. Kamstra
ATTORNEY 2,955,212

MAGNETIC CONTROL CIRCUITS

Paul Mallery, Murray Hill, N.J., assignor to Bell Telephone Laboratories, Incorporated, New York, N.Y., a corporation of New York Filed Dec. 15, 1958, Ser. No. 780,586

17 Claims. (Cl. 307—88)

This invention relates to magnetic control circuits and particularly to such circuits employing magnetic structures having nonlinear hysteresis loop characteristics.

Magnetic control circuits utilizing the memory and switching functions of magnetic structures capable of remaining in a particular magnetic state to which driven by an applied magnetomotive force are well known and have found wide application in the information and data handling arts. Thus, for example, toroidal magnetic cores having substantially rectangular hysteresis characteristics together with their windings have become a familiar part of the electrical circuitry of those arts. However, other core geometries have also been found advantageous and in many instances have been used to more fully exploit the possibilities of flux control in magnetic circuits. One such core geometry is that described by T. H. Crowley and U. F. Gianola in the copending application Serial No. 732,549, filed May 2, 1958. A magnetic structure is there described which defines by means of its elements a plurality of possible flux paths. Each of the paths has at least a portion thereof which is flux limited. The cross-sectional area of the portion is such that it bears a particular relation to the cross-sectional areas of the other paths and is limited in the lines of flux which may be induced in it without regard to an increase in the applied magnetomotive force.

One specific illustrative embodiment of such a structure comprises a pair of magnetic side rails and a plurality of transverse rungs disposed between them, the side rails and rungs defining the paths. In such a structure it has been found that the flux in any particular path will be completed through another or other paths which offer the lowest reluctance virtually by-passing the paths whose reluctance is higher. By limiting the flux capacity of each path and then suitably controlling the reluctance of the paths, a particular induced flux distribution may be selectively steered through any required path. Output means inductively coupled to the latter path provide the means for detecting the selective flux shift. Logic functions and the like which may be performed with structures such as the foregoing are also described in the aforementioned copending application. Although the logic operations which may be performed in such structures are virtually unlimited, particular operations may require structures which tend to considerable complexity both in circuit connections required and extent of flux structures to be coupled together.

Accordingly, it is an object of this invention to provide a relatively simple magnetic structure for performing particular logic operations.

It is also an object of this invention to provide a new and novel magnetic structure, through a plurality of flux-limited legs of which flux may be selectively steered to accomplish logic operations.

Particularly, it is an object of this invention to make a parity check in connection with a self-checking binary code.

Still another object of this invention is to provide a new and novel three-dimensional flux-limited structure.

These and other objects of this invention are achieved in one specific illustrative embodiment thereof comprising a three-dimensional magnetic structure having a pair of side rails supporting at opposite points a double helix. A structure having four helically curved members connecting on either side the pair of side rails results, with each of the side rails and members having the same flux-limiting cross-sectional dimensions. The side rails are additionally connected at each end by a transverse member also having the same cross-sectional dimensions as the side rails. A third rail running substantially parallel to the pair of side rails is connected at each end by a pair of right angle extensions to the transverse members connecting the side rails at each end. The third rail together with its extensions is of a cross-sectional dimension such that its flux-limitation is twice that of each of the previously described members. In the foregoing structure it is evident that a saturation flux in each of the side rails may be simultaneously closed through the third rail and its extensions which members may be regarded as a return path for any flux appearing in the remaining members of the structure. Due to the greater cross-sectional dimensions of the return path, the flux in neither one of the side rails would be sufficient to saturate the members making up the latter path.

The flux distribution just described may be assumed as the initial magnetic condition of this invention preparatory to performing an illustrative logic operation. The flux in each of the side rails may be reversed in polarity by applying a magnetomotive force of sufficient magnitude to reverse the totality of flux in the third rail return path. If selected portions of each of the side rails are now denied as closure paths to the switching fluxes, the latter may be simultaneously steered from each of the side rails through the helical members to the other side rail to effect complete flux closure. This selected denial is accomplished according to the principles of this invention by means of holding currents applied to windings inductively coupled to the portions of the side rails at which flux closure is to be denied.

In the specific illustrative embodiment to be considered in detail hereinafter the structure of this invention is employed to perform a parity check for a four-bit binary code. In accordance therewith an output winding is inductively coupled to each of the side rails at a point immediately preceding a confluence of the fluxes in the rail in one of the transverse members. One of the windings may be assigned as a "check" output and the other as a "fail" output. The switching flux in the side rails may now be steered in a manner such that a flux reversal is caused in the portion of the rail only to which one of the output windings is coupled. Such a reversal would generate in the coupled output winding, in a well-known manner, a voltage representative of the "check" or "fail" operation of the flux steering. The windings on which the binary input bits are introduced into the structure are coupled to both of the rails at portions selected so as to divert the switching flux through the helical connecting members to the rail portions carrying the winding on which an output signal is to be generated. Which of the two output windings is to be activated will in turn be determined by the combination of input windings energized.

In the exemplary parity check operation of an embodiment of this invention to be described in detail herein, the determination is made whether the number of binary "1's" in a given code is odd or even. To accomplish this check a parity bit is included in each code with the result that a correct code has an odd number of "1" bits and an incorrect code has an even number of "1" bits.

Each of the input windings is energized in accordance with the coded information and its parity bit at the same time that a switching drive magnetomotive force is applied to the third rail. If the combination of inputs is such as to represent a correct code, the side rails will be magnetically selectively blocked and the switching flux diverted through the helical connecting members to cause a flux reversal at the coupled "check" output winding to produce a corresponding output signal. Should the combination of inputs contain an error, the resulting flux reversal will occur at the "fail" output winding to produce a "fail" output signal. A reset magnetomotive force applied to the third rail in a subsequent phase of operation restores the flux distribution of the structure to its originally described pattern preparatory to a succeeding checking operation.

According to one aspect of this invention it is a feature thereof that a pair of flux conducting side rails have connecting members arranged so that a switching flux in one of the rails may be diverted to the other rail at the same time that a second switching flux in the latter rail is diverted to the first rail.

Another feature of this invention is a pair of flux conducting side rails having connected members arranged three-dimensionally to provide a plurality of simultaneous flux by-paths.

Still another feature of this invention is a magnetic structure for providing a pair of magnetic circuits having at least one flux path in common and a plurality of helical diversionary paths for diverting flux between the other paths of the circuits.

It is a further feature of this invention that a pair of flux-limited side rails support therebetween a double helix such that a flux in one of the rails may be completed from one end to the other through any combination of either rails or helixes or both.

The foregoing and other objects and features of this invention will be better understood from a consideration of the detailed description of one specific illustrative embodiment thereof which follows when taken in conjunction with the accompanying drawing in which.

Figure 1:
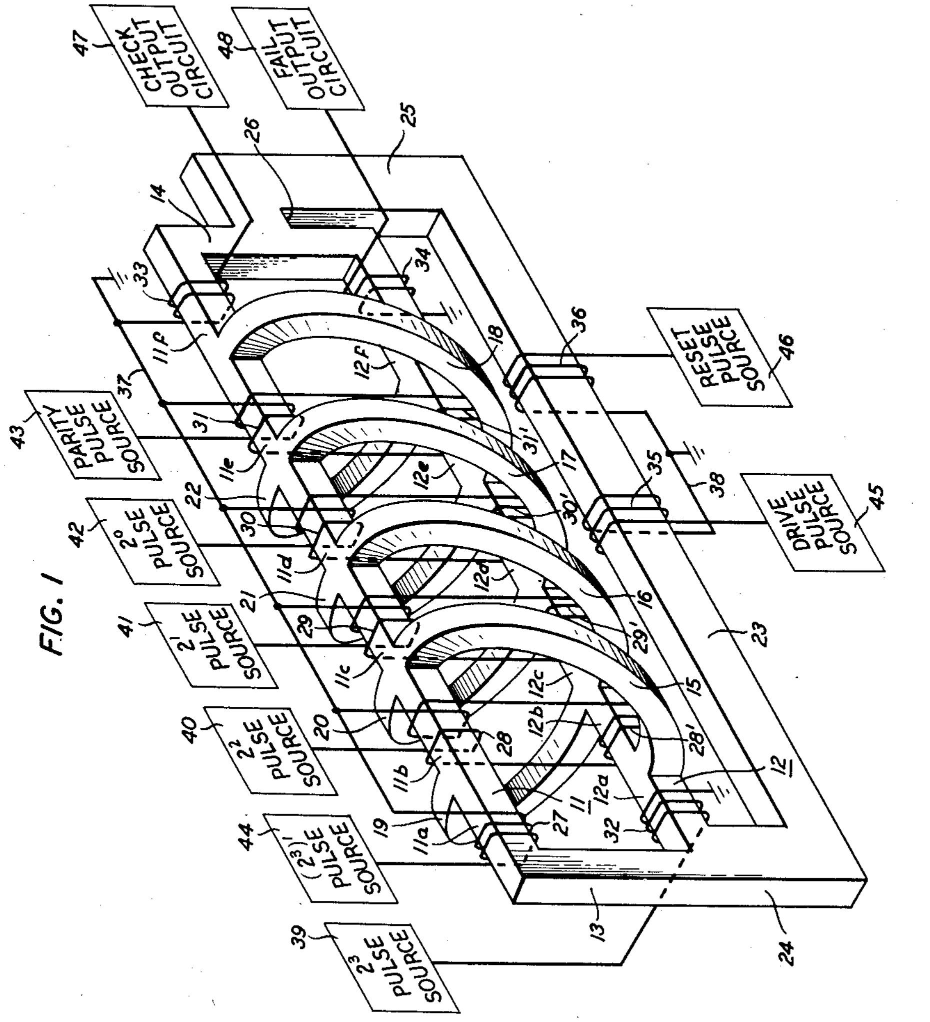
Fig. 1 is a perspective view of an illustrative magnetic structure according to the principles of this invention showing the disposition of the windings thereon.

A specific structure illustrative of the principles of this invention is depicted in Fig. 1. As there shown, the structure may advantageously be made up of a ferrite material which exhibits substantially nonlinear hysteresis characteristics and comprises a pair of side rails 11 and 12 disposed in a substantially parallel arrangement and a pair of transverse members 13 and 14 connecting the side rails 11 and 12 at each end. A plurality of additional members together making up a double helix also connect the side rails 11 and 12 on two sides of the structure. On the near side of the structure as viewed in Fig. 1, the latter members include the members 15, 16, 17, and 18, and on the far side also as viewed in Fig. 1, included are the members 19, 20, 21, and 22. Inspection of Fig. 1 readily shows the first helix to comprise the members 15, 20, 17, and 22, and the second helix to comprise the members 19, 16, 21, and 18, each in that sequence. A third rail member 23 is arranged also substantially parallel to the rails 11 and 12 and is connected to each of the transverse members 13 and 14 by a pair of uprights 24 and 25, respectively. The upright 24 is connected to the junction of the transverse member 13 while the upright 25 is connected to substantially the center of the transverse member 14 by a short bridge 26 for reasons which will become apparent from the description of the operation of the invention hereinafter.

Each of the structural elements so far described, except those comprising the double helix, is advantageously flux limited and is related in cross-sectional dimensions such that predetermined multiples of flux magnitudes may be closed through the plurality of magnetic circuits defined by the elements. Specifically, the third rail 23, uprights 24 and 25 and bridge 26 are each of a cross-sectional dimension as compared to the cross-sectional dimensions of each of the rails 11 and 12, and tranverse members 13 and 14, such that in the order of two times the amount of flux may be induced in the former elements than in the latter elements listed. The structural elements 15 through 22 comprising the double helix may also be flux limited but the dimensions of these elements are dictated only by the amount of flux which must find a path therethrough in the manner to be described. With these cross-sectional relationships in mind, it will be readily apparent that two saturation flux circuits will be presented: one defined by the rail 11 and the second defined by the rail 12 and both sharing a common return rail 23. As will be later described, each of these magnetic circuits may be rechanneled through the connecting helix members in various combinations of flux paths.

Figure 2:
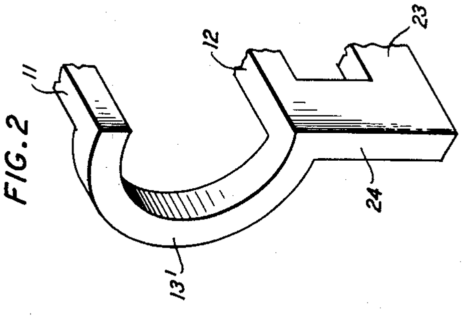
Fig. 2 shows an alternate construction of one end of the structure of Fig. 1.

The magnetic structure of Fig. 1 may advantageously be formed as an integral unit by conventional molding techniques. In this connection, although the transverse member 13 is shown as being straight, to facilitate the removal of a cylindrical core during the molding process, the member 13 may advantageously be formed circularly without affecting the operation of this invention. Such an alternate construction is shown in the partial view of Fig. 2 where a curved connecting member 13' connects the side rails 11 and 12.

A plurality of windings are inductively coupled to the foregoing structure and for purposes of describing their location it will be convenient to divide each of the side rails 11 and 12 into segments separated respectively by the junctions of the helix members. Thus, the segments **11*a* through 11*f* of the rail 11 are defined by the helix members 19 through 22 and 18, and the segments 12*a* through 12*f* of the rail 12 are defined by the helix members 15 through 18 and 22. A plurality of input windings 27 through 31 are inductively coupled to the rail segments 11*a* through 11*c* of the rail 11, respectively, and another input winding 32 is coupled to the rail segment 12*a* of the rail 12. The windings 28 through 31 coupled to the rail segments 11*b* through 11*e*, respectively, are doubled so as also to be inductively coupled to the rail segments 12*b* through 12*e*, respectively. The windings on the latter segments are for convenience designated as the windings 28', 29', 30', and 31'. A pair of output windings 33 and 34 are coupled to the rail segments 11*f* and 12*f*, respectively, and a drive winding 35 and a reset winding 36 are coupled to the third rail 23. One side of each of the windings 27 through 31 is connected to a ground bus 37 as is also one side of the output winding 33. One side of each of the windings 35 and 36 is connected to a ground bus 38 as is also one side of the output winding 34 and one side of the input winding 32** is also grounded.

Connected to the other side of the input windings 27 through 32 are a plurality of input signal sources for providing the setting current pulses representative of the binary code to be checked. In the illustrative embodiment of the invention being described a four-bit binary code is assumed as previously stated. In accordance therewith and to properly effect a parity check, input current pulse sources representing the binary values $2^3$, $2^2$, $2^1$, and $2^0$ are connected to the input windings. Thus, a $2^3$ input current pulse source 39 is connected to the other side of the winding 32, a $2^2$ input current pulse source 40 is connected to the other side of the winding 28—28', a $2^1$ input current pulse source 41 is connected to the other side of the winding 29—29′, and a $2^0$ input current pulse source 42 is connected to the other side of the winding 30—30′. A parity input current pulse source 43 is connected to the other side of the winding 31—31′. In order to accomplish an exemplary parity check of this invention the prime of the binary value $2^3$ is also applied to the circuit and is provided by a $(2^3)'$ input current pulse source 44 connected to the other side of the input winding 27. A drive current pulse source 45 is connected to the other side of the drive winding 35 and a reset current pulse source 46 is connected to the other side of the reset winding 36. "Check" and "fail" output circuits 47 and 48 may advantageously be connected to the output windings 33 and 34, respectively. Each of the current pulse sources contemplated in this invention may comprise signal generators well known in the art capable of producing current pulses of the polarity and magnitudes to be described hereinafter. The current pulse sources may also obviously comprise the outputs of other components of the system of which the circuit of this invention advantageously comprises a part. Accordingly, these current sources need not be described in detail at this point. The output circuits 47 and 48 also need be considered only by general reference herein, the employment of "check" and "fail" signals of the character provided by this invention also being well known.

For purposes of describing the operation of this invention it will be assumed that an exemplary four-bit code "0101" together with a parity bit "1" is to be checked. In accordance with the necessary condition to produce a "check" output signal, an odd number of binary "1's" must appear in this code, and the manner of achieving such a signal will now be described. Normally the structure of this invention will be in a magnetic condition such as that depicted in Fig. 3. As the result of a previously applied negative reset current pulse to the reset winding 36, the return rail 23 will have been magnetically saturated and is accordingly magnetically remanent in the directions which may conveniently be symbolized by the broken lines 49 and 50. The flux thus induced in the rail 23 is closed in the opposite direction through each of the side rails 11 and 12. When the negative reset pulse is applied to the winding 36, both of the rails 11 and 12 are saturated in the same direction throughout their entire lengths since these members present the shortest path between the transverse members 13 and 14. Since the flux is limited by the cross-sectional dimensions of the side rails, no flux will be available to magnetically affect any of the helical members each of which as a result may be regarded as initially magnetically neutral. In accordance with the above binary code to be checked, positive input current pulses are applied from the sources 40 and 42 and from the parity pulse source 43 to the windings 28—28′, 30—30′, and 31—31′, respectively. In addition, in the configuration of the specific embodiment of Fig. 1, a positive input current pulse is also applied from the pulse source 44 to the winding 27. Substantially simultaneously with the application of the input current pulses representing the binary code and its parity bit, a positive drive current pulse is applied from the source 45 to the winding 35 of the return rail 23.

Figure 3:
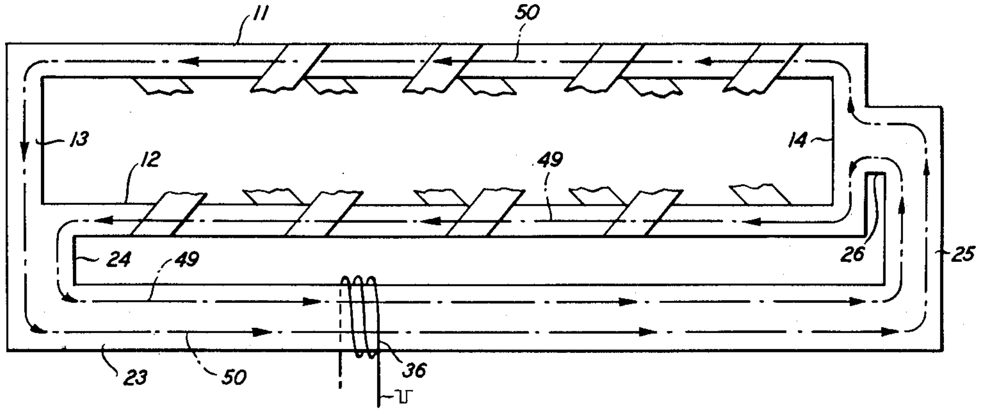
Fig. 3 is a simplified side view of the structure of Fig. 1 showing the normal flux distribution preparatory to the performance of a logic operation.
Figure 4:
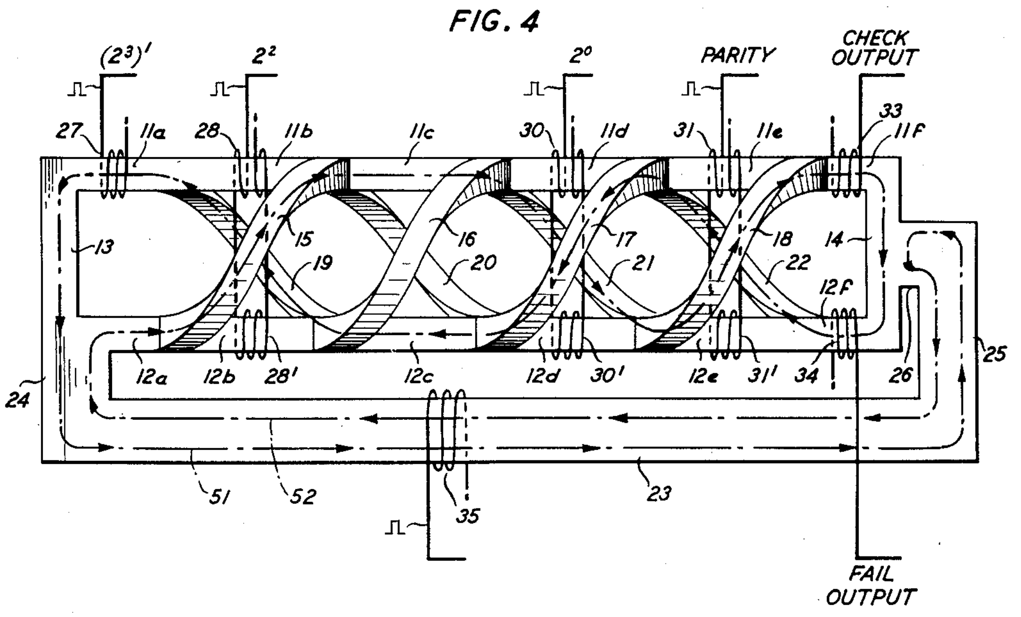
Fig. 4 is a similar view of Fig. 2 showing the flux redistribution during an illustrative logic operation.

The circuit elements energized during the drive phase of operation together with the resulting flux redistribution is more clearly depicted in Fig. 4. Reference to the latter figure shows the energized input windings 27, 28—28′, 30—30′, and 31—31′ to be coupled to the rail segments 11*a*, 11*b*, 12*b*, 11*d*, 12*d*, 11*e*, and 12*e*, respectively. The sense of the foregoing input windings is such that the magnetomotive forces developed by the input current pulses will be in the direction of the flux in the coupled rail segments. The magnitude of the input current pulses is sufficient to maintain the flux in the latter segments as against any switching flux which may appear during the drive phase of operation. As a result, the rail segments 11*a*, 11*b*, 11*d*, and 11*e* of rail 11, and rail segments 12*b*, 12*d*, and 12*e* will be effectively blocked to the closure of switching flux. The sense of the drive winding 35 is such that the magneto-motive force developed by the drive current pulse will be in the direction opposing that represented by the broken lines 49 and 50 in Fig. 3. However, only so much of the flux in the return rail 23 will be reversed in direction as there are closure paths available. Although the blocked rail segments are denied as closure paths to the switching flux, diversionary paths are simultaneously provided for switching flux in each of the rails 11 and 12 by the helical connecting members 15 through 22. Flux closure will also follow the shortest route through the structure and by providing a differential in the closure paths at the ends of the structure, the switching flux may be controlled to generate the required output. Thus, a preferred path is provided between the side rails 11 and 12 and the return rail 23 at the transversal members 24 as compared to the less direct path presented by the central junction of the transverse member 14 and bridge 26.

To return to a consideration of the rail segments, the segments 11*c*, 11*f*, 12*a*, 12*c*, and 12*f* remain unblocked and accordingly are available as closure paths from the switching flux. However, due to the flux-limited cross sections of all available closure paths and the insufficient number of such paths, the flux in the return rail can be only partially reversed. The unreversed portion of the flux is symbolized in Fig. 4 by the broken line 51. The reversed portion, symbolized by the broken line 52, may be traced through its closure as follows: upright 24, rail segment 12*a*, helix member 15, rail segment 11*c*, helix member 21, helix member 18, rail segment 11*f*, and transverse member 14. At this point the flux-limitation of the bridge 26 prevents closure from the rails 11 and 12 and the flux magnitudes represented by the lines 51 and 52 close on each other. The magnetic flux redistribution, as a result, continues via rail segment 12*f*, helix member 22, helix member 17, rail segment 12*c*, helix member 19, rail segment 11*a*, at which latter point the switching flux closes with the flux which initially appeared in the return rail 23, upright 24, and transverse member 13.

A comparison of the flux distribution as represented in Fig. 3 with that represented in Fig. 4 shows that as a result of the foregoing drive operation a complete flux reversal took place in the rail segments 12*a*, 11*c*, and 11*f*. An output voltage signal is accordingly induced in the coupled winding 33 of the segment 11*f* which voltage is made available in the "check" output circuit 47 to represent the fact of a correct binary code input.

In a manner similar to that described for the binary code "0101", it may be shown that for any other four-bit binary code containing an even number of "1's," the flux redistribution upon the application of the reset current pulse will be traceable through the structure without causing a flux reversal in the rail segment 12*f* to which the "fail" output winding 34 is coupled. In each such case, however, a flux reversal will occur in the rail segment 11*f*. Should the input current pulse combination have been such as to represent a binary code containing an error, that is, an odd number of binary "1's," the flux redistribution during the drive phase would have caused a flux reversal in the rail segment 12*f* without causing such a reversal in the rail segment 11*f*. This may readily be demonstrated from a consideration of the blocked rail segments as compared to the available rail segments for flux closure under such a "fail" condition.

Advantageously, no reasonable upper limit is set for the magnitude of any of the energizing current pulses applied. Due to the flux-limitation of each available path, the operation of this invention is in no wise affected by an over driving of any of the windings. On the other hand, since the input current pulses need perform only a flux holding function, the power expenditure may be maintained at a minimum.

In a subsequent reset phase of operation, a negative reset current pulse applied from the source 46 to the winding 36 restores the flux distribution to its normal state as depicted in Fig. 3. Since at this time the flux in the rail segment **11*f*** is reversed back to its normal direction, it is evident that the "check" or "fail" output may be taken during either the drive or reset phase of operation. Further, by forming the structure of this invention from a magnetic material the hysteresis loop of which is substantially rectangular, the memory aspect of this invention may be exploited. In the latter case, the input phase may be separated in time from the drive phase of operation.

In describing the operation of this invention, the flux pattern and its redistribution have been considered in terms of distinguishable magnitudes represented in Figs. 3 and 4 by the broken lines 49 and 50, and 51 and 52, respectively. Obviously this is to be understood as only for convenience in describing the principles of this invention. Thus, this invention could just as readily have been described in terms of the conventional dynamic hysteresis characteristic curve. In terms of such an explanation, for example, the rail member 23 would be considered as having been subjected to a flux excursion from one remanent point on the loop to a point of substantially zero remanence during the drive phase of operation.

Although the diversionary paths connecting the side rails 11 and 12 have been described as taking the form of a double helix, it is further to be understood that the structure need only effectively present such a configuration. From a consideration of the foregoing principles of operation of this invention and the disposition of the doubled input windings, it is readily apparent that corresponding points of the side rails 11 and 12 are simultaneously blocked to the switching flux. As a result, a three-dimensional by-path arrangement presents the most advantageous means for shifting the switching fluxes simultaneously from each side rail to the other around the corresponding blocks. Although an actual curved helix path presents the shortest path from one side rail to the other in view of these circuit conditions, almost any other structural track accomplishing the specific flux by-passes described as dictated by the system of which this invention may be a part may evidently be used.

What has been described is considered to be only an illustrative embodiment according to the principles of this invention and it is to be understood that various and numerous other arrangements may be devised by one skilled in the art without departing from the spirit and scope of this invention.

What is claimed is:

1. A magnetic control device comprising a first and a second magnetic side rail, a return magnetic rail, each of said rails having substantially rectangular hysteresis characteristics, means for inducing a magnetic flux in one direction in said return rail, means for closing said flux in the opposite direction through said first and said second side rails, means for simultaneously magnetically blocking said first and said second rails to flux closure at predetermined points, and by-pass members connected from said first rail to said second rail and from said second rail to said first rail for completing flux paths around said predetermined points.

2. A magnetic control device comprising a first and a second magnetic side rail, a return magnetic rail, each of said rails having substantially rectangular hysteresis characteristics, means for inducing a magnetic flux in one direction in said return rail, means for closing said flux in the opposite direction through said first and said second side rails, means for inducing a switching flux in the opposite direction in said return rail, blocking means for simultaneously magnetically blocking said first and said second side rails to said switching flux at predetermined points, and by-pass members connected from said first rail to said second rail and from said second side rail to said first side rail for completing flux paths around said predetermined points.

3. A magnetic control device according to claim 2 in which each of said magnetic rails is flux limited, said return rail being limited in flux multiples of the order of twice that of either of said first or said second side rail.

4. A magnetic control device according to claim 2 in which each of said first and said second side rails has an output winding inductively coupled thereto at another point.

5. A magnetic control device according to claim 2 in which said blocking means comprises a blocking winding inductively coupled to each of said first and second rails at said predetermined points and means for simultaneously applying a blocking current pulse to said blocking windings.

6. A magnetic control device comprising a first magnetic member presenting a first and a second flux path, a second substantially helical magnetic member for completing one of said flux paths, a third substantially helical magnetic member for completing the other of said flux paths, said second and third helical members exhibiting substantially rectangular hysteresis characteristics, a plurality of magnetic shunting members connecting said second and said third helical members, and first inductive means coupled to said plurality of shunting members for selectively blocking said last-mentioned members to flux closure in one direction.

7. A magnetic control device according to claim 6 also comprising means inductively coupled to said first magnetic member for establishing a normal flux in said first and second flux path, said flux in each of said paths being completed through said shunting members, and second inductive means for inducing a switching flux in one of said first and second flux paths, said switching flux being completed through said shunting members and helical members as controlled by said first inductive means.

8. A magnetic control device according to claim 7 also comprising output windings inductively coupled to particular ones of said shunting members energized responsive to flux reversals in said last-mentioned members for generating output signals.

9. An electrical circuit comprising a first and a second magnetic rail, input windings inductively coupled to each of said rails at first, second, and third predetermined points, respectively, a first magnetic member connected between said first and second points of said first rail and between said second and third points of said second rail, a second magnetic member connected between said second and third points of said first rail and between said first and second points of said second rail, a third magnetic rail, each of said magnetic rails and magnetic members exhibiting substantially rectangular hysteresis characteristics, means for inducing a magnetic flux in said third rail, means for closing said flux through said first and second rails, and means including a source of current pulses connected to the input windings of each of said first and second rails coupled at said second points, respectively, for steering said flux through said first and second magnetic members.

10. An electrical circuit according to claim 9 also comprising an output winding coupled to each of said first and second rails at corresponding fourth predetermined points energized responsive to flux changes in the respective rails for generating output signals.

11. An electrical code checking circuit comprising a first and a second magnetic rail, a plurality of input windings coupled to each of said rails at corresponding predetermined points, a first plurality of magnetic members connected between said predetermined points of said first rail and the next succeeding predetermined points of said second rail, a second plurality of magnetic members connected between said predetermined points of said second rail and the next succeeding predetermined points of said first rail, a third magnetic rail, each of said magnetic rails and magnetic members exhibiting substantially rectangular hysteresis characteristics, means for inducing a magnetic flux in said third rail, means for closing a magnetic flux in said third rail through said first and said second rail, and means for applying input current pulses to particular combinations of input windings representative of a correct code to magnetically block said first and second rails at particular ones of said predetermined points.

12. An electrical code checking circuit according to claim 11 also comprising means for inducing a switching flux in said third rail, said switching flux being closed through said first and second rails and said first and second plurality of members to reverse the flux in a segment of one of said first and second rails as controlled by said input currents, and an output winding inductively coupled to said segment energized responsive to said flux reversal for generating an output signal indicative of said correct code.

13. An electrical code checking circuit according to claim 12 in which each of said rails and said first and second plurality of magnetic members is flux limited in multiples of a predetermined flux value.

14. An electrical code checking circuit comprising a first, second, and third magnetic flux-limited rail each disposed substantially parallel with the others, each of said rails having substantially rectangular hysteresis characteristics, said third rail being flux limited in substantially twice the flux value of either of said first and second rails, means for inducing a normal flux in said third rail in one direction, magnetic means at each end of each of said rails for completing said normal flux through each of said first and second rails in the opposite direction, a plurality of input windings coupled to said first and second rails at corresponding points thereon, means for applying input current pulses to said input windings representative of a correct code for magnetically blocking said corresponding points of said first and second rails to flux reversals, means for subsequently inducing a switching flux in said third rail, a plurality of magnetic members connecting said first and second rails for simultaneously by-passing said corresponding points to permit said switching flux to cause a flux reversal at another point in one of said first or second rails, and a first output winding coupled to said last-mentioned rail at said other point energized responsive to said last-mentioned flux reversal for generating an output signal indicative of said correct code.

15. An electrical code checking circuit according to claim 14 also comprising other input windings coupled to said first and second rails at corresponding other points thereon, means for applying input current pulses also to said other input windings representative of an incorrect code for magnetically blocking said corresponding other points of said first and second rails to flux reversals, a plurality of other magnetic members connecting said first and second rails for simultaneously by-passing said corresponding other points to permit said switching flux to cause a flux reversal at another point in the other of said first or second rails, and a second output winding coupled to said last-mentioned rail at said other point energized responsive to said last-mentioned flux reversal for generating an output signal indicative of said incorrect code.

16. An electrical code checking circuit according to claim 15 in which each of said pluralities of magnetic members connecting said first and second rails is flux limited in substantially the flux value of either of said first and second rails and said pluralities of magnetic members effectively comprise helically directed flux paths.

17. An electrical code checking circuit according to claim 16 in which one of said magnetic means at each end of each of said rails presents a shorter return path for flux from each of said first and second rails to said third rail than is presented by the other of said magnetic means.

References Cited in the file of this patent

UNITED STATES PATENTS

| | | |
|---|---|---|
| 2,519,426 | Grant | Aug. 22, 1950 |
| 2,869,112 | Hunter | Jan. 13, 1959 |